(12) United States Patent
Fedorchuk et al.

(10) Patent No.: US 8,788,139 B2
(45) Date of Patent: Jul. 22, 2014

(54) MULTI-PROTOCOL VEHICLE DIAGNOSTIC INTERFACE DEVICE AND METHOD

(75) Inventors: Andriy Fedorchuk, Mississauga (CA); Alban Hoxha, Mississauga (CA)

(73) Assignee: Webtech Wireless Inc., Burnaby (CA)

( * ) Notice: Subject to any disclaimer, the term of this patent is extended or adjusted under 35 U.S.C. 154(b) by 297 days.

(21) Appl. No.: 13/052,780

(22) Filed: Mar. 21, 2011

(65) Prior Publication Data

US 2012/0245786 A1 Sep. 27, 2012

(51) Int. Cl.
*G01M 17/00* (2006.01)
*H04L 29/08* (2006.01)
*H04L 29/06* (2006.01)

(52) U.S. Cl.
CPC ............... *H04L 67/12* (2013.01); *H04L 69/18* (2013.01); *G07C 2205/02* (2013.01)
USPC .......................... 701/31.5; 701/29.1; 701/34.3

(58) Field of Classification Search
USPC ..................... 701/33.2, 29.1, 31.4, 29.4, 31.5, 701/34.2–34.4
See application file for complete search history.

(56) References Cited

U.S. PATENT DOCUMENTS

| | | | |
|---|---|---|---|
| 4,853,850 A | 8/1989 | Krass, Jr. et al. | |
| 6,772,248 B1 | 8/2004 | McClure et al. | |
| 6,807,469 B2 | 10/2004 | Funkhouser et al. | |
| 6,925,368 B2 | 8/2005 | Funkhouser et al. | |
| 7,092,803 B2 | 8/2006 | Kapolka et al. | |
| 7,337,245 B2 | 2/2008 | McClure et al. | |
| 7,725,630 B2 | 5/2010 | McClure et al. | |
| 7,895,342 B2 | 2/2011 | Sodergren | |
| 2001/0025323 A1* | 9/2001 | Sodergren | 709/251 |
| 2004/0138790 A1* | 7/2004 | Kapolka et al. | 701/33 |

OTHER PUBLICATIONS

Author unknown, Model HDV100A2 J1708 and J1939 RS-232 Converter, date unknown, 1 page, B&B Electronics Mfg. Co., www.bb-elec.com.
Author unknown, OBD II to RS-232 Data Streamer, Model: LDVDS-S, date unkown, 2 pages, B&B Electronics Mfg. Co., www.bb-elec.com.
Author unknown, NEXIQ Wireless Vehicle-Link, MPI-122048, date unknown, 2 pages, www.ntxtools.com.
Author unknown, ELM 327 OBD to RS232 Interpreter, date unknown, 76 pages, Elm Electronics, www.elmelectronics.com.

* cited by examiner

*Primary Examiner* — Thomas Tarcza
*Assistant Examiner* — Kevin Myhre
(74) *Attorney, Agent, or Firm* — John Flanagan; Carie Mager

(57) ABSTRACT

An interface device includes a processor, a memory communicating with the processor and containing indicators of vehicle operational parameters from which a user may select to set up filters, a communication module communicating with the processor, and a plurality of protocol bus modules supporting different multiple vehicle diagnostic protocols and have multiple filters for set up in correspondence with the indicators of user-selected parameters. The processor is configured to control the memory and modules to cooperate with one another to find the correct protocol out of multiple supported protocols, define the indicators of user-selected parameters by saving user-initiated filter setups, read data regarding user-selected parameters from a vehicle diagnostic communication port according to the filter setups, and output messages regarding the user-selected parameters.

20 Claims, 27 Drawing Sheets

Vehicle Communication

- Common format of vehicle messages

| Header or Message Identifier | Data Length | Data Field |
|---|---|---|
| 4 bytes | 1 byte | Up to 17 bytes |

- Each bus has its own interpretation of header and data field

*Fig. 7A*

Vehicle Communication

- Format of J1939 vehicle messages

| Header or Message Identifier | | | Data Length | Data Field |
|---|---|---|---|---|
| Priority | PDUF | PDUS | | |
| | | SA | | |
| 4 bytes | | | 1 byte | Up to 8 bytes |

- Priority — bit 8 is a flag "Request", it shows transmission method - broadcast or on request;
  bit 7 is a flag "Calculated Data";
  bits 3-5 are priority bits (SAE J1939/71).

- PGN — parameter group number (SAE J1939/71), it includes bits 1-2 of Priority byte, PDUF and PDUS.

- SA — source address.

*Fig. 7B*

Vehicle Communication

- Format of J1708 vehicle messages

| Header or Message Identifier | | | Data Length | Data Field |
|---|---|---|---|---|
| Request | Page | MID | | |
| | | PID | 1 byte | Up to 17 bytes |
| 4 bytes | | | | |

- Request — bit 8 is a flag "Request", it shows transmission method - broadcast or on request;
  bit 7 is a flag "Calculated Data";
  bits 0-3 are priority bits of transmitted messages (SAE J1708/J1587).
- Page — shows the page of PID (page 0 represents PID 0-255).
- MID — message ID (SAE J1708/J1587).
- PID — parameter ID (SAE J1708/J1587).

*Fig. 7C*

Vehicle Communication

- Format of OBDII CAN 29 bits ID vehicle messages

| Header or Message Identifier | | | Data Length | Data Field |
|---|---|---|---|---|
| Priority | Type | TA | SA | | |
| 4 bytes | | | | 1 byte | Up to 8 bytes |

- Priority — priority byte.
- Type — type of message, either functional request or physical request/response.
- TA — target address.
- SA — source address.
- Filter setup is done on the basis of internal database, therefore, customer just fills up all filters with address of parameters from correspondent database.

*Fig. 7D*

Vehicle Communication

- Format of OBDII CAN 11 bits ID vehicle messages

| Header or Message Identifier | | | Data Length | Data Field |
|---|---|---|---|---|
| Not used | Not used | Priority | SA | | |
| 4 bytes | | | | 1 byte | Up to 8 bytes |

- Not used — two most significant bytes are not used and contain value 0x00.
- Priority — priority byte.
- SA — address of functional request or physical request/response.
- Filter setup is done on the basis of internal database, therefore, customer just fills up all filters with address of parameters from correspondent database.

*Fig. 7E*

Vehicle Communication

- Format of ISO 9141/14230 vehicle messages

| Header or Message Identifier | | | Data Length | Data Field |
|---|---|---|---|---|
| Format | TA | SA | | |
| | LEN | | | |
| 4 bytes | | | 1 byte | Up to 17 bytes |

- Format — format of header defines if address and length of data field are included.
- TA — functional or physical address of target.
- SA — source address.
- LEN — length of data field.
- Filter setup is done on the basis of internal database, therefore, customer just fills up all filters with address of parameters from correspondent database.

*Fig. 7F*

Vehicle Communication

- Format of J1850 VPW/PWM vehicle messages

| Header or Message Identifier | | | Data Length | Data Field |
|---|---|---|---|---|
| Format | TA | SA | | |
| | | LEN | | |
| 4 bytes | | | 1 byte | Up to 17 bytes |

- Format — format of header defines the length of header (1 or 3 bytes) and type of addressing.
- TA — target address.
- SA — source address.
- LEN — length of data field is not the part of original J1850 messages, it is included to simplify data processing.
- Filter setup is done on the basis of internal database, therefore, customer just fills up all filters with address of parameters from correspondent database.

*Fig. 76*

Vehicle Communication

- Samples of J1939 filter setup

| Header or Message Identifier | | | | Description |
|---|---|---|---|---|
| Priority | PDUF | PDUS | SA | |
| $0C | $F0 | $04 | $00 | Engine Speed, PGN 61444, priority 3, SPN 190, broadcast |
| $98 | $FE | $DC | $00 | Engine Total Idle Hours, PGN 65244, SPN 235, priority 6, on request |
| $40 | $00 | $00 | $C9 | Calculated Trip Odometer, internal address $C9 |

- Filter Mask   - $00 FF FF 00 - read all messages regardless of priority and source address (not applied to calculated data).

*Fig. 8A*

Vehicle Communication

- Samples of J1708 filter setup

| Header or Message Identifier | | | Description |
|---|---|---|---|
| Request | Page | MID | PID | |
| $00 | $00 | $80 | $BE | Engine Speed, MID 128, PID 190, broadcast |
| $88 | $00 | $80 | $EB | Engine Total Idle Hours, MID 128 PID 235, priority 8, on request |
| $40 | $00 | $00 | $C9 | Calculated Trip Odometer, internal address $C9 |

- Filter Mask    - $00 00 FF FF - read all messages regardless of page.

*Fig. 8B*

Database Configuration

- Example of OBDII CAN 11-bit ID
- First line is request, second line is response
- Filter mask by default - $FFFFFF00

| Not used | Not used | Priority | SA | Data Field | Address | Description |
|---|---|---|---|---|---|---|
| 00 00 | 00 00 | 00 00 | 00 00 | 00 00 00 00 00 00 00 00<br>00 00 00 00 00 00 00 00 | 0 | null index |
| 00 00 | 00 00 | 07 07 | DF E8 | 02 01 00 00 00 00 00 00<br>06 41 00 00 00 00 00 00 | 1 | PIDs supported [01-20], functional request, legislated J1979 |
| 00 00 | 00 00 | 07 07 | DF E8 | 02 01 0D 00 00 00 00 00<br>03 41 0D 00 00 00 00 00 | 2 | Road speed, functional request, legislated J1979 |
| 00 00 | 00 00 | 07 07 | DF E8 | 02 01 0C 00 00 00 00 00<br>04 41 0C 00 00 00 00 00 | 3 | Engine speed, functional request, legislated J1979 |
| 00 00 | 00 00 | 07 07 | DF E8 | 02 01 05 00 00 00 00 00<br>03 41 05 00 00 00 00 00 | 4 | Coolant temperature, functional request, legislated J1979 |
| 00 00 | 00 00 | 07 07 | DF E8 | 02 01 10 00 00 00 00 00<br>04 41 10 00 00 00 00 00 | 5 | MAF, functional request, legislated J1979 |
| 00 00 | 00 00 | 07 07 | DF E8 | 01 03 00 00 00 00 00 00<br>06 43 00 00 00 00 00 00 | 6 | Trouble codes, legislated J1979 |
| 00 00 | 00 00 | 07 07 | DF E8 | 02 09 02 00 00 00 00 00<br>10 11 49 02 00 00 00 00 | 7 | Vehicle identification number, legislated J1979 |
| 00 00 | 00 00 | 07 07 | DF E8 | 02 01 2F 00 00 00 00 00<br>03 41 2F 00 00 00 00 00 | 8 | Fuel level, legislated J1979 |

*Fig. 9A*

Database Configuration

| Not used | Not used | Priority | SA | Data Field | Address | Description |
|---|---|---|---|---|---|---|
| 00 00 | 00 00 | 00 00 | 00 00 | 02 01 5E 00 00 00 00<br>04 41 5E 00 00 00 00 00 | 9 | Fuel rate, functional request, legislated J1979 |
| 00 00 | 00 00 | 07 07 | DF E8 | 02 01 11 00 00 00 00 00<br>03 41 11 00 00 00 00 00 | 10 | Throttle position, functional request, legislated J1979 |
| 00 00 | 00 00 | 07 07 | DF E8 | 02 01 65 00 00 00 00 00<br>04 41 65 00 00 00 00 00 | 11 | Transmission gear, functional request, legislated J1979 |
| 00 00 | 00 00 | 07 07 | DF E8 | 02 01 42 00 00 00 00 00<br>04 41 42 00 00 00 00 00 | 12 | Control module voltage, functional request, legislated J1979 |
| 00 00 | 00 00 | 07 07 | DF E8 | 02 01 50 00 00 00 00 00<br>06 41 50 00 00 00 00 00 | 13 | External test equipment configuration, functional request, legislated J1979 |
| 00 00 | 00 00 | 07 07 | DF E8 | 02 01 20 00 00 00 00 00<br>06 41 20 00 00 00 00 00 | 14 | PID supported [21-40], functional request, legislated J1979 |
| 00 00 | 00 00 | 07 07 | DF E8 | 02 01 40 00 00 00 00 00<br>06 41 40 00 00 00 00 00 | 15 | PID supported [41-60], legislated J1979 |
| 00 00 | 00 00 | 07 07 | DF E8 | 02 01 60 00 00 00 00 00<br>06 41 60 02 00 00 00 00 | 16 | PID supported [61-80], legislated J1979 |
| 00 00 | 00 00 | 07 07 | DF E8 | 02 01 01 00 00 00 00 00<br>06 41 01 00 00 00 00 00 | 17 | MIL status and DTC number legislated J1979 |

*Fig. 9B*

Database Configuration

| Not used | Not used | Priority | SA | Data Field | Address | Description |
|---|---|---|---|---|---|---|
| 00 00 | 00 00 | 00 00 | 00 B4 | 00 00 00 00 00 00 00 00 00 00 00 00 00 00 00 00 | 18 | Road speed, Toyota Prius, broadcast messages, data bytes 5-6, $400-10km/h |
| 00 00 | 00 00 | 00 03 | 00 CA | 00 00 00 00 00 00 00 00 00 00 00 00 00 00 00 00 | 19 | Road speed, Toyota Prius, broadcast messages, data byte 2, 1km/h |
| 00 00 | 00 00 | 00 05 | 00 A4 | 00 00 00 00 00 00 00 00 00 00 00 00 00 00 00 00 | 20 | Gas gauge, Toyota Prius, broadcast messages, data byte 1 |

*Fig. 9C*

Calculated Parameters

- There are a number of parameters which are calculated on the basis of received vehicle data. ALLBus comprises a set of internal filters which are filled up with parameters necessary to support calculation procedures.
- ID of calculated parameters consists of 4 bytes where LSB contains an address of parameter. First three MSB bytes of OBDII calculated parameters are 0x00, while J1939/J1708 parameters additionally have bit 6 of MSB set to 1.

| Calculated Parameter | Address (or Index) | Number of bytes | Bit resolution and Units | Description |
|---|---|---|---|---|
| Trip odometer | 201 | 4 | 0.1 km | • Distance travelled after last start of engine. This value is available after engine stop but zeroed onto each engine start. |
| Trip fuel consumption | 202 | 4 | 0.1 Liter | • Fuel consumed after last start of engine. This value is available after engine stop but zeroed onto each engine start. |
| OBD fuel rate | 203 | 4 | 1/1000 GPH | • Fuel rate calculated on the basis of MAF. |
| Trip engine hours | 204 | 4 | 1 sec | • Elapsed engine time after last engine start. |
| Battery voltage | 205 | 4 | 0.01 V | • Measured voltage on the power input of interface. |

*Fig. 10*

Modem Communication

- Message format

| SOF | MID | FID | Number of data bytes | Data field | Checksum |
|---|---|---|---|---|---|
| 2 bytes | 1 byte | 1 byte | 1 byte | Up to 100 bytes | 1 byte |

- SOF      - start of frame, two bytes: 0x55 0x55.
- MID      - message ID identifies the type of message (or type of vehicle bus).
- FID      - function ID identifies the type of message function.
- Number of data byte      - number of bytes in data filed.
- Data field      - receiving or transmitting data.
- Checksum      - simple sum of message's bytes.

*Fig. 11A*

Modem Communication

- Sample of messages - "Get Filter", request of filter's data.

| SOF | MID | FID | Number of data bytes | Data field | Checksum |
|---|---|---|---|---|---|
| | | | | Filter number | |
| 55 55 | xx | 28 | 01 | xx | xx |
| 2 bytes | 1 byte | 1 byte | 1 byte | 1 byte | 1 byte |

- Data field contains only one byte - number of filter requested to send data out.
- Filter number:
  - 0x0X - regular filters
  - 0x8X - extended filters

*Fig. 11B*

Modem Communication

- Sample of messages - "Return Bus Data"

| SOF | MID | FID | Number of data bytes | Data field | | | | | | Checksum |
|---|---|---|---|---|---|---|---|---|---|---|
| | | | | Common status | Filter number | Time stamp | Encapsulated vehicle message | | | |
| | | | | | | | ID | Data length | Data | |
| 55 55 | xx | 70 | xx | xx | xx | xx xx | xx xx | xx | xx | xx |
| 2 bytes | 1 byte | 1 byte | 1 byte | 1 byte | 1 byte | 2 bytes | 4 bytes | 1 byte | Up to 8 bytes | 1 byte |

- Common status:
  - Bit 0 - filter status ON/OFF
  - Bit 1 - data status New/Old
  - Bit 7 - engine status ON/OFF

- Encapsulated vehicle message: message received from vehicle

*Fig. 11C*

MULTI-PROTOCOL VEHICLE DIAGNOSTIC INTERFACE DEVICE AND METHOD

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The subject matter of the present invention is directed generally to interfacing external diagnostic services with vehicle data links providing diagnostic information and, more particularly, is concerned with a multi-protocol vehicle diagnostic interface device and method.

BACKGROUND ART

Vehicles of various types utilize onboard computers to control and monitor the functioning of the various subsystems and components of the vehicle. The vehicle onboard computer typically interfaces with multiple sensors and switches associated with the engine, power train, and various mechanical and electrical systems. These monitoring and sensing devices continuously detect vehicle operational parameters and provide electrical signals representative of their status to the onboard computer. The data collected by the onboard computer can be useful in the diagnosis of subsystem and component malfunctions. For that reason, the vehicle onboard computer typically includes a diagnostic communication port that, through use of one or more of a variety of different communication protocols implemented by vehicle manufacturers, allows collected parameter data to be transmitted externally to where the parameter data may be processed, stored, interpreted, and acted upon to address the malfunctions. The connector for the vehicle diagnostic communication port is typically found under the dashboard of the vehicle near the steering column.

Devices are known that are designed to act as interfaces between external diagnostic services and diagnostic communication ports of vehicle onboard computers utilizing different diagnostic communication protocols. Examples of such devices are disclosed in U.S. Pat. Nos. 4,853,850, 6,807,469 and 7,092,803, 7,725,630 and 7,895,342. Also, examples of such devices are found in commercial products, such as the "ELM327 OBD to RS232 Interpreter" marketed by Elm Electronics, Inc., the "OBD II to RS-232 Data Streamer" and "J1708 and J1939 RS-232 Converter" marketed by B&B Electronics, and the "Wireless Vehicle Link" marketed by NEXIQ.

These devices appear to represent appropriate steps toward making more accessible the operational parameter data collected by vehicle onboard computers. However, more comprehensive innovations are desired to address a broad range of users' needs.

SUMMARY OF THE INVENTION

The subject matter of the present invention is directed to an innovation that involves a multi-protocol vehicle diagnostic interface device and method. The device supports multiple different network standards or protocols, automatically finds the correct vehicle protocol, reads data according to user-selected filters setup, and employs a single output unified structure for all supported protocols.

Accordingly, in one aspect of the present invention, the multi-protocol vehicle diagnostic interface device includes a processor, a memory communicating with the processor and containing indicators of vehicle operational parameters from which a user may select to set up different ones of multiple filters, a communication module communicating with the processor, and a plurality of protocol bus modules supporting different multiple vehicle diagnostic protocols and having multiple filters for set up in correspondence with the indicators of user-selected parameters. The processor is configured to control the memory and modules to cooperate with one another to find the correct protocol out of multiple supported protocols, define the indicators corresponding to user-selected parameters by saving user-initiated filter setups, read data regarding user-selected parameters from a vehicle diagnostic communication port according to the filter setups, and output messages regarding the user-selected parameters.

In another aspect of the present invention, the multi-protocol vehicle diagnostic interface system includes a processor, a memory communicating with the processor and containing indicators of vehicle operational parameters from which a user may select to set up different ones of multiple filters, a communication module communicating with the processor, a calculation module communicating with the processor, and a plurality of protocol bus modules supporting different multiple vehicle diagnostic protocols and having multiple filters for set up in correspondence with the indicators of user-selected parameters. The processor is configured to control the memory and modules to cooperate with one another to find the correct protocol out of multiple supported protocols, define the indicators corresponding to user-selected parameters by saving user-initiated filter setups, read data regarding the user-selected parameters from a vehicle diagnostic communication port according to the filter setups, make calculations concerning operational parameters, and output messages regarding the user-selected parameters.

In still another aspect of the present invention, the multi-protocol vehicle diagnostic interface method includes the steps of finding the correct vehicle onboard computer diagnostic protocol out of different multiple supported protocols, defining the indicators corresponding to different user-selected multiple vehicle operational parameters by saving user-initiated filter setups, reading data regarding user-selected parameters from a vehicle diagnostic communication port according to the filter setups, and outputting messages regarding the user-selected parameters.

BRIEF DESCRIPTION OF THE DRAWINGS

For clarity, the drawings herein are not necessarily to scale, and have been provided as such in order to illustrate the principles of the subject matter, not to limit the invention.

FIGS. 7A-7G are formats of messages of the multiple supported vehicle diagnostic protocols from the communication port.

FIGS. 8A and 8B are samples of J1939 and J1708 filter setups.

FIGS. 9A-9C together is a configuration of OBDII database employed by the interface device and method.

FIG. 10 is a chart relating to parameters calculated by the interface device and method.

FIGS. 11A-11C are formats of messages relating to modem communication.

DESCRIPTION OF EMBODIMENTS

Figure 1:
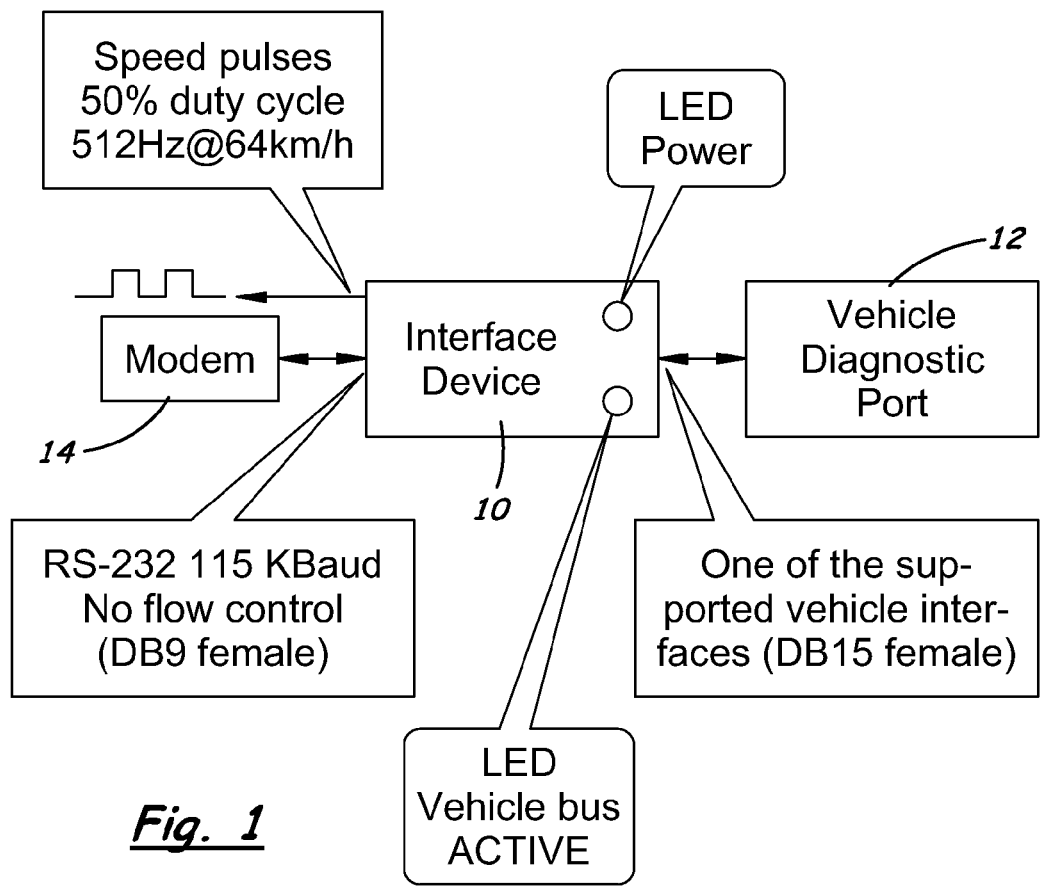
FIG. 1 is a simplified block diagram showing interconnection of a multi-protocol vehicle diagnostic interface device of the present invention with a modem and a vehicle diagnostic port.

Referring to FIG. 1, there is shown in simplified block diagram form the basic environment in which is employed a multi-protocol diagnostic interface device, generally designated 10, of the present invention. Hereinafter, for the sake of brevity, the multi-protocol vehicle diagnostic interface device will be referred to as the "interface device". As represented in the block diagram, the interface device 10 may be a stand-alone device, interconnecting a conventional diagnostic communication port 12 of an onboard computer (not shown) of a vehicle, such as a passenger car or truck, with a conventional external communication device 14, such as a modem, PC or the like.

Figure 2:
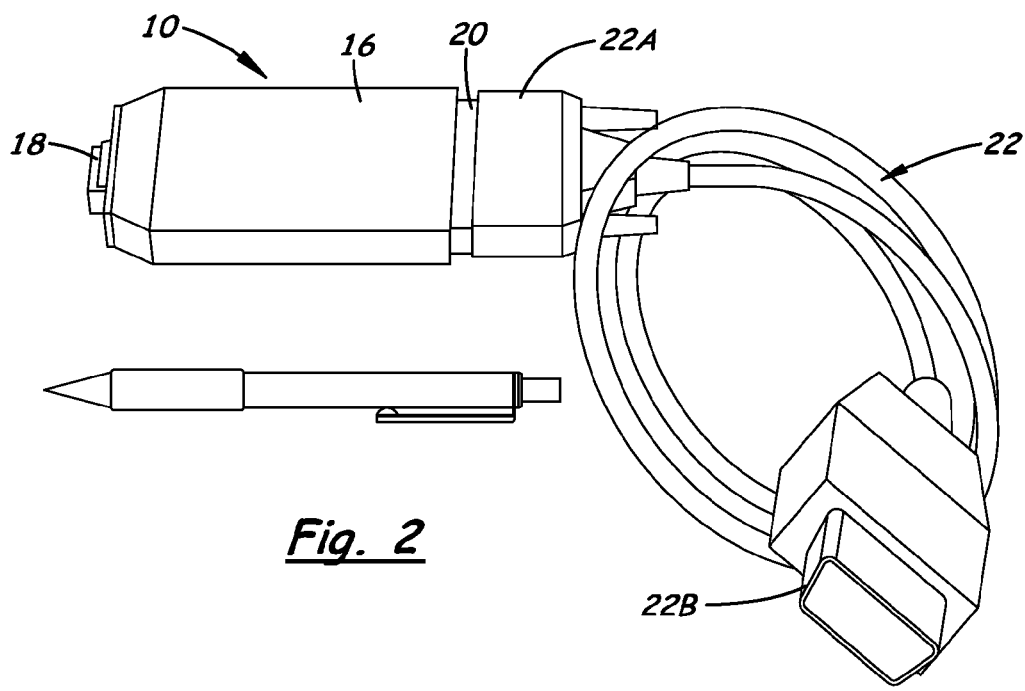
FIG. 2 is a perspective view of an exemplary form of a hardware unit that embodies the interface device.

Referring now to FIG. 2, there is illustrated an exemplary form of a hardware unit embodying the interface device 10. The interface device 10 has a protective case 16 and two electrical connectors 18, 20 permanently mounted and externally exposed at opposite ends of the case 16. A writing pen is shown next to the hardware unit for the sole purpose of making an easy visual comparison of their relative sizes. An example of specifications for the hardware unit may be: (1) dimensions—10.4 cm×4.2 cm×2.0 cm; (2) input voltage from+9V to +36V; (3) input current—50 mA@12V typical in normal mode; and power protection—1 A fuse and overvoltage protection circuit up to 200V.

Connector 18 is designed for connecting directly with the aforementioned external communication device 14, for example the modem, to provide communication, for example, with external diagnostic services (not shown). The connector 18 may be one providing a standard RS232 connection that accommodates the external communication device 14. As an example, the connector 18 can be a DB9 female (9-socket) connector.

Connector 20 is designed for connecting with the vehicle diagnostic communication port 12 to provide communication of the multi-protocol interface device 10 with the vehicle onboard computer (not shown). As an example, the connector 20 can be a DB15 female (15-socket) connector. In the exemplary form shown in FIG. 2, the connector 20 connects indirectly with the vehicle diagnostic communication port 12 through use of an electrical cable 22. The cable 22 has a first electrical connector plug 22A at one end complementarily designed to electrically connect with the connector 20 and a second electrical connector plug 22B at the opposite end complementarily designed to electrically connect with the vehicle diagnostic communication port 12. The cable 22 allows placement and/or installation of the interface device 10 at a location within the vehicle that is more convenient and accessible to a user away from the location of the diagnostic communication port 12 in the vehicle.

Figure 3:
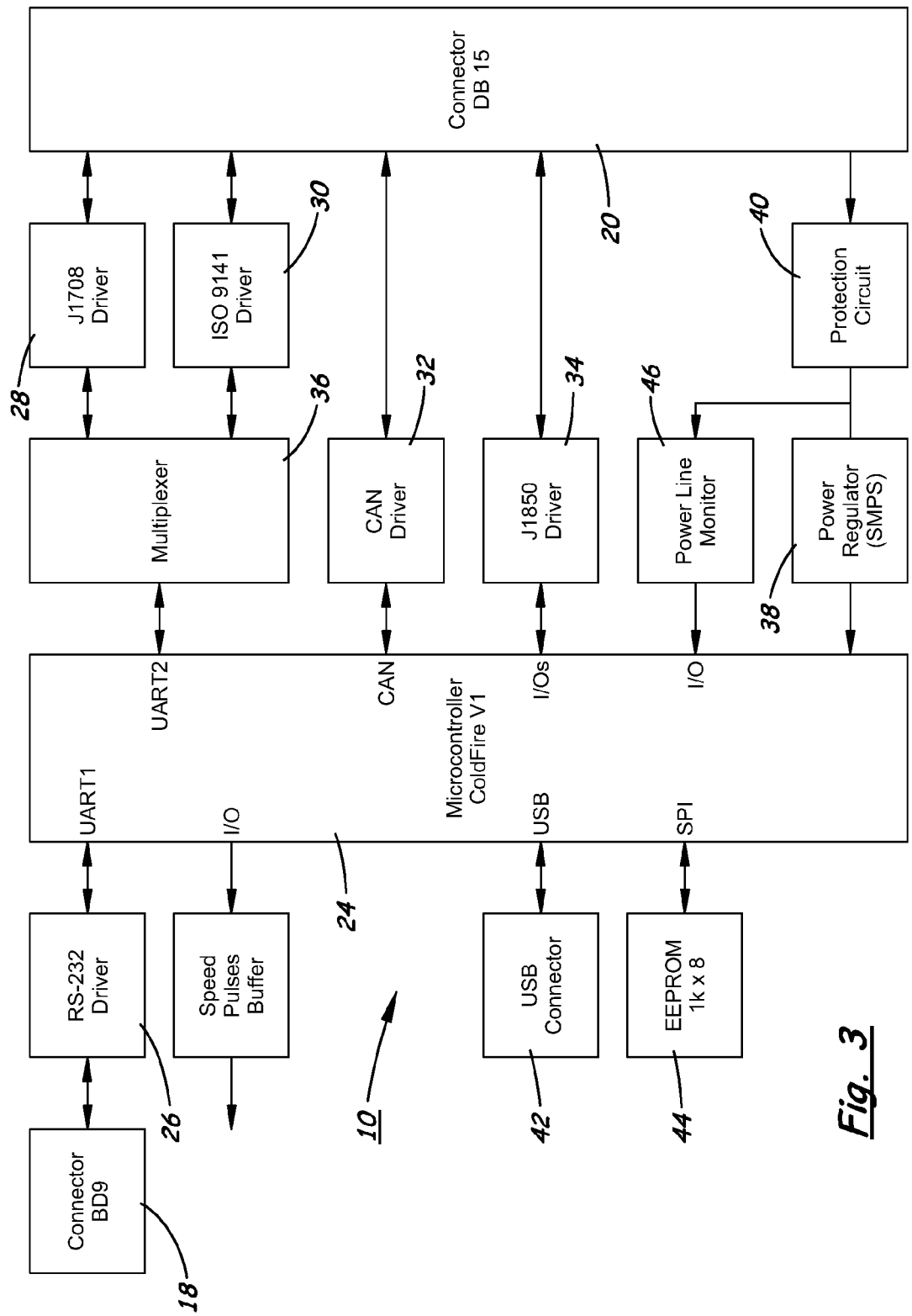
FIG. 3 is a detailed block diagram of an exemplary embodiment of the physical architecture of the interface device.

Referring now to FIG. 3, there is illustrated in a detailed block diagram of an exemplary embodiment of the physical architecture of the interface device 10, in addition to the electrical connectors 18, 20 which are also shown. One component of the interface device 10 is a microcontroller 24 with inbuilt processor and memory. The microcontroller 24 may be a commercial-available unit designated as a Cold Fire V1 Microcontroller. Another component of the interface device 10 is a RS-232 communication driver 26 provided in communication with the external communication device 14 (FIG. 1) via the connector 18.

Other components of the interface device 10 are different J1708, ISO9141, CAN and J1850 protocol drivers 28-34, as well as a multiplexer 36 interposed between the microprocessor 24 and each of J1708 and ISO9141 protocol drivers 28, 30. The protocol drivers 28-34 are provided in communication with the vehicle diagnostic communication port 12 (FIG. 1) via the connector 20. The multiplexer 36 allows the interface device 10 to work with either J1708 or ISO9141 networks. Interface device works simultaneously with two networks using J1939 and J1708 protocols which may be present on a truck and serve different electronic systems. For example, the power train system may use J1939 protocol, but fuel system may use J1708 protocol. So, an aspect of the interface device 10 is supporting simultaneously multiple protocols which can be present on the same vehicle. Further components can include a power regulator 38 and protection circuit 40. Power line monitor 46 measures the voltage on input power line and controls wake up condition of interface device. The measured voltage may be considered as Battery Voltage. For future extension of functions, additional components that can be accommodated are a USB connector 42 and EEPROM 44.

Each component depicted in FIG. 3, except the microcontroller 24, is a piece of hardware designed to execute a single function. For example, CAN driver 32 is a transceiver of CAN bus, the same applies to the other drivers 28, 30 and 34. The microcontroller 24 is a multi-functional device containing inbuilt processor, RAM, Flash memory and many special controllers. For example, inbuilt UART2 controller is a part of ISO9141 and J1708 physical layers (generally, hardware layers). Inbuilt UART1 is a part of the RS232 physical layer. Inbuilt CAN controller is a part of J1939 and OBDII CAN physical layers. J1850 buses do not have inbuilt controllers. Signal from J1850 physical layers is processed by firmware directly on I/Os (input/output pins). The power line monitor 46 is connected to inbuilt an ADC (analog-digital converter). Each physical layer provides the first step of signal processing and selecting a unit (bit, byte or entire message) of information which will be processed by firmware on the higher level. Each physical layer sets up an interrupt to warn the processor that data is ready.

Figure 4:
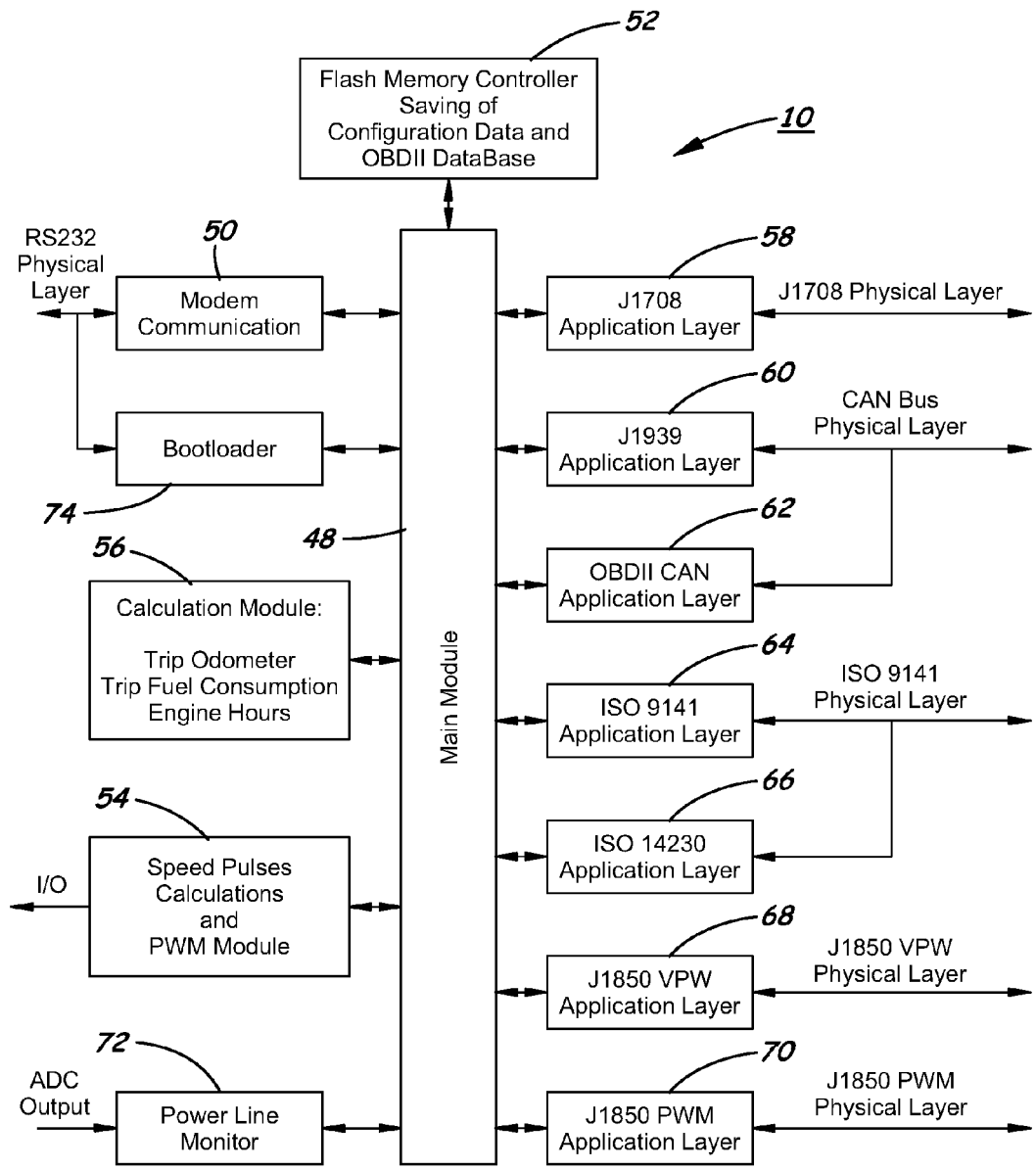
FIG. 4 is a detailed block diagram of an exemplary embodiment of the firmware architecture of the interface device.

Referring to FIG. 4, there is illustrated a detailed block diagram of an exemplary embodiment of the firmware architecture of the interface device 10. Firmware contained in the memory of the microcontroller 20 (FIG. 3) includes the following components: (1) a main module 48 controlling operation of the interface device 10, as per the relatively self-explanatory detailed flow diagram depicted in FIGS. 5A-5F; (2) a communication module 50 supporting communication with the external communication device 14 (FIG. 1) by means of a set of commands (refer to FIGS. 11A-11C); (3) a flash memory controller module 52 supporting the saving of configuration data in a flash memory of the microcontroller 20; (4) a speed pulses controller module 54 controlling output speed pulses; (5) a calculation module 56 controlling calculations of one or more parameters, namely, trip odometer, trip fuel consumption, trip engine hours and OBD fuel rate (refer also to FIGS. 5G and 10); (6) J1708, J1939, OBDII CAN, ISO 9141, ISO 14230, J1850 VPW, J1850 PWM protocol bus controller modules 58-70 supporting the different vehicle diagnostic protocols; (7) a power line monitor module 72 controlling power line voltage (see also FIG. 5G); (8) a bootloader 74 (see also FIG. 5A). The different protocols supported by the interface device 10 are as follows: J1708; J1939; OBDII CAN—11 bit ID/500 kBaud,—29 bit ID/500 kBaud,—11 bit ID/250 kBaud and—29 bit ID/250 kBaud; ISO 9141; ISO 14230—(fast initialization) and—(slow initialization); and J1850—VPW and—PWM.

A bootloader module 74 is used for reprogramming or upgrading the firmware via the modem communication serial port using a set of commands as follows. Bootloader entrance is effected by sending 'y' in the first six seconds after power cycle or command "RESET". Bootloader commands are: 'e'—erase chip; 'p'—program chip; 'r'—reset; and 'l'—get bootloader ID. The bootloader routine is depicted in FIG. 5A.

There are three blocks which take part in processing of signals from each automotive bus. Hardware drivers 28-34 in FIG. 3 and hardware controllers (CAN and UART), which are the part of microcontroller 24 in FIG. 3 constitute the physical layer of each bus. The firmware modules 58-70 in FIG. 4 are the third part of processing chain. In case of J1850 physical layer contains only hardware driver and all data processing is done on firmware level.

Some of the firmware components use common physical layer (hardware driver/controller). For example, J1939 and OBDII CAN firmware modules are using the same CAN bus physical layer, as shown in FIG. 3. The firmware uses interrupts; when controller is ready, it sets up the interrupt and firmware module picks up the data for the next step of processing.

Figure 5A:
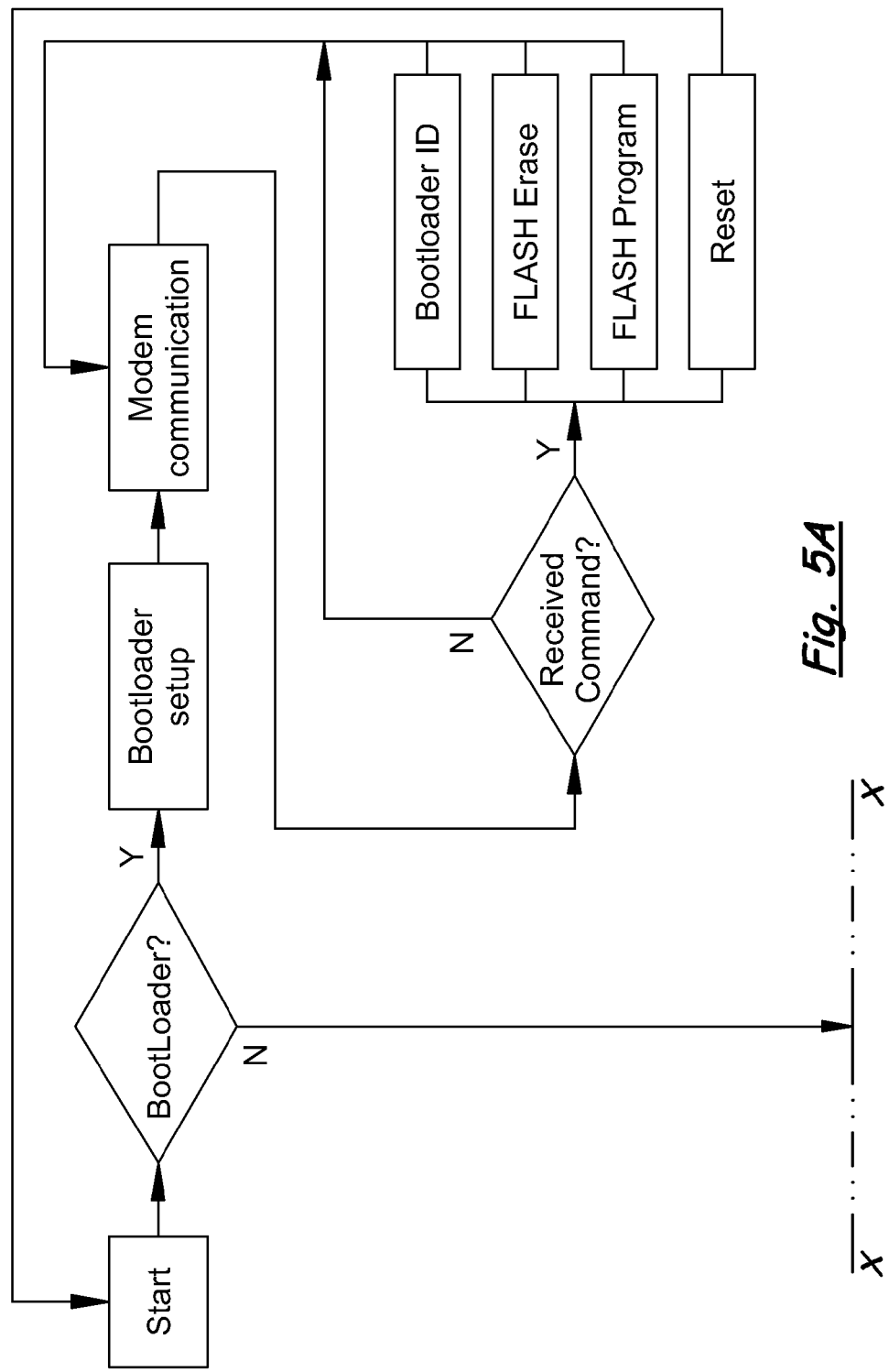
FIGS. 5A-5G together form a detailed flow diagram of a sequence of operational steps performed by the firmware of the interface device.

Referring to FIGS. 4 and 5A-5G, all modules are part of a main program located in flash memory of microcontroller 24 and executed by the processor of the microcontroller 24 (FIG. 3). Regarding the process of start up, the bootloader module 74 and communication module 50 use the same physical layer. On start up, the processor executes bootloader routine (FIG. 5A). Depending on the entered command, the processor will stay with bootloader 74 or pass control to the main (application) module 48. Depending on the values of variables BusActive and BusONOFF (see FIG. 5C), the main module 48 starts activation of the proper module 58-70. After finding the active (or correct) bus, main module 48 downloads the user setup of filters from the flash memory 52. After this, the processor starts controlling all firmware modules.

Regarding the process of receiving data from a bus, the main module 48 has two modes of receiving data from the vehicle buses, monitor mode and request mode. In request mode the main module 48 accepts broadcast messages and sends request for some messages according to the filter setup. In monitor mode the main module 48 just reads and outputs to the modem communication module 50 the entire message traffic on the bus. In monitor mode all regular filters save data regardless of filter setup. When the processor gets a signal that new data from a particular physical layer is ready, it starts to execute the firmware module related to this layer. Firmware modules 58-70 compile final messages on the basis of data received from the physical layer and perform some functions that are necessary to support communication. The modules 58-70 push the final message in a receive queue. All messages are kept in the same format as they came from the bus. To support a single format of vehicle messages (FIG. 7A) which are going to external devices, some messages are slightly changed with respect to just the header thereof. The main module 48 pulls out the message from the receive queue, compares it with the parameter's indicator or ID of all filters and saves it in the proper filter setting the flag "new data".

Regarding the process of transmitting data on the bus, the main module 48 can transmit data on the bus only in the request mode. The main module 48 polls all filters, selects what data should be requested and passes the transmit message to the specific module 58-70. The modules 58-70 prepare the message for transmitting and pass it to the physical layer.

Regarding the process of sending data to the external device (modem) 14, the main module 48 polls all filters, selects the messages with the flag "new data" and pushes them in transmit queue of the modem communication module 50. The modem communication module 50 pulls out the message from the queue and passes it to the RS232 physical layer. The main module 48 has two modem communication modes—dumping and request. In dumping mode the main module 48 outputs data from all filters with an active flag "new data". In request mode the main module 48 is waiting for a data request command from the external device 14.

Regarding the process of the flash memory controller module 52, it saves data in flash memory (nonvolatile memory) regarding OBDII database and filters configuration data. After power up, the main module 48 reads filter configurations to populate the filters. Regarding the process of the calculation module 56, it calculates some parameters on the basis of data located in internal filters and saves these parameters as trip odometer, etc. Regarding the process of the power line monitor, it calculates the battery voltage on the basis of data received from an ADC. Also, in a sleep mode, the main module 48 controls the battery voltage threshold and wakeup of the main module 48. If the main module 48 detects no signal on an active bus, then it goes into the sleep mode.

The main module 48 manipulates information in different formats. Modules 58-70 are firmware modules which output the message received from the vehicle bus. They get information from the physical layers on the basis of interrupts. Also, they get information on different levels. Modules 60 and 62 receive an entire message from the bus and output this message. These modules provide additional functions described below. Modules 58, 64 and 66 receive information on the byte level, only one byte of message. They compile a message and output it. Modules 68 and 70 receive information on the bit level. They compile bytes. They compile bytes, a message and output it. The main module 48 picks up the output messages from modules 58-70 and save them in the proper filters. Output messages have different formats depending on the bus protocols.

Unified messages are provided in the case of output messages via RS232 port. Each of these messages contain a data portion wherein is located an entire vehicle message. So, the vehicle message is wrapped inside of output message, which contains additional information, such as time stamp, filter number or status bits. The interface device 10 receives and controls all messages on all protocol buses but sends to the external communication device 14 only those which have been selected by a user's filters. The use of filters reduces traffic through the external communication device 14. For some buses, the included original messages are slightly modified to have similar frame for all messages regardless of the bus type—four byte header, one byte data length and data section—as seen in FIG. 7A. Refer to formats of messages of the multiple supported vehicle diagnostic protocols from the communication port 12 in FIGS. 7B-7G.

The modules 58-70 automatically supports specific functionalities of some protocols, such as, transmitting on J1708 bus, address claiming on J1939 bus, multi-packet messages processing on OBDII CAN bus and initialization and wake up messages on ISO9141/14230 bus.

Figure 5B:
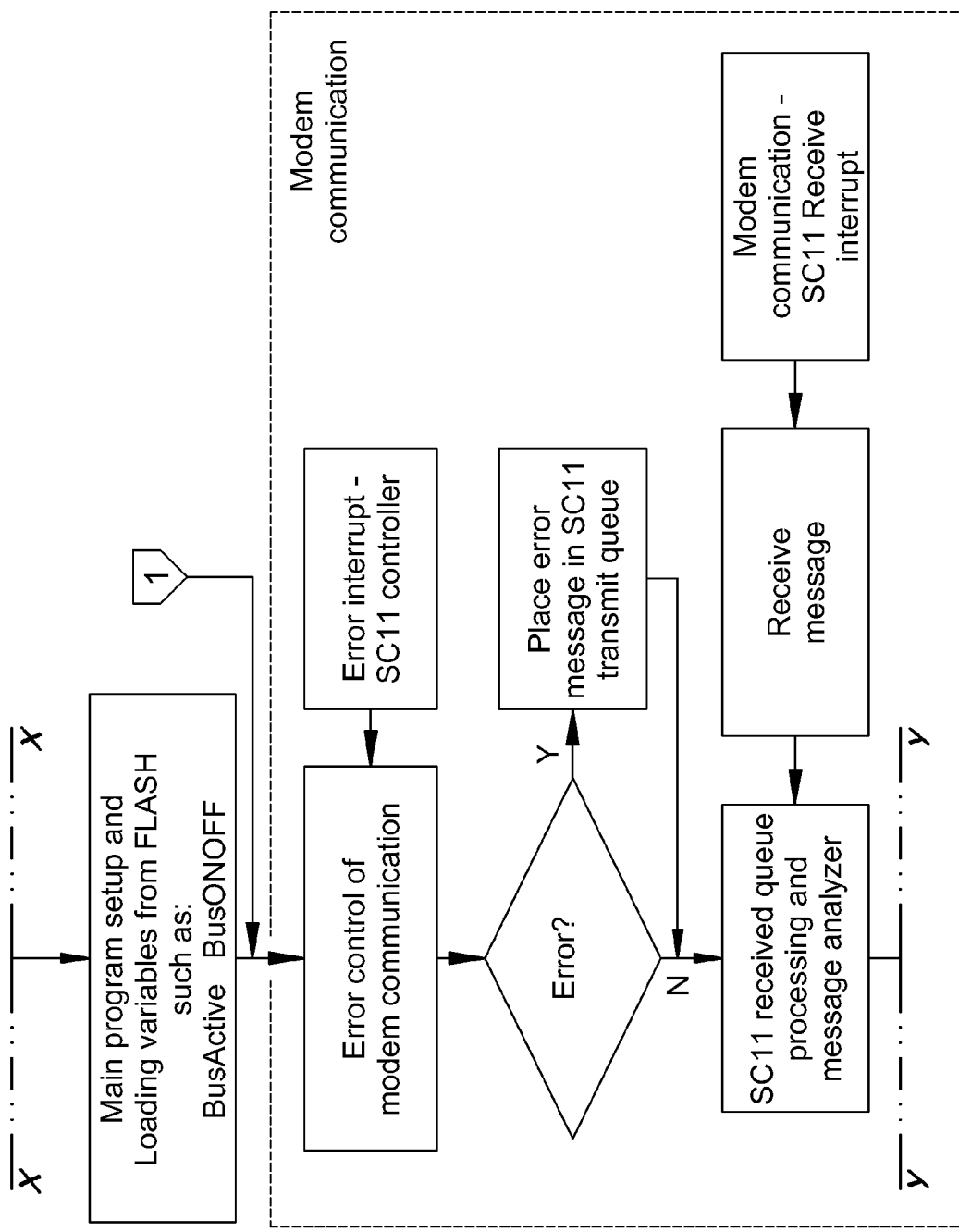
Figure 5C:
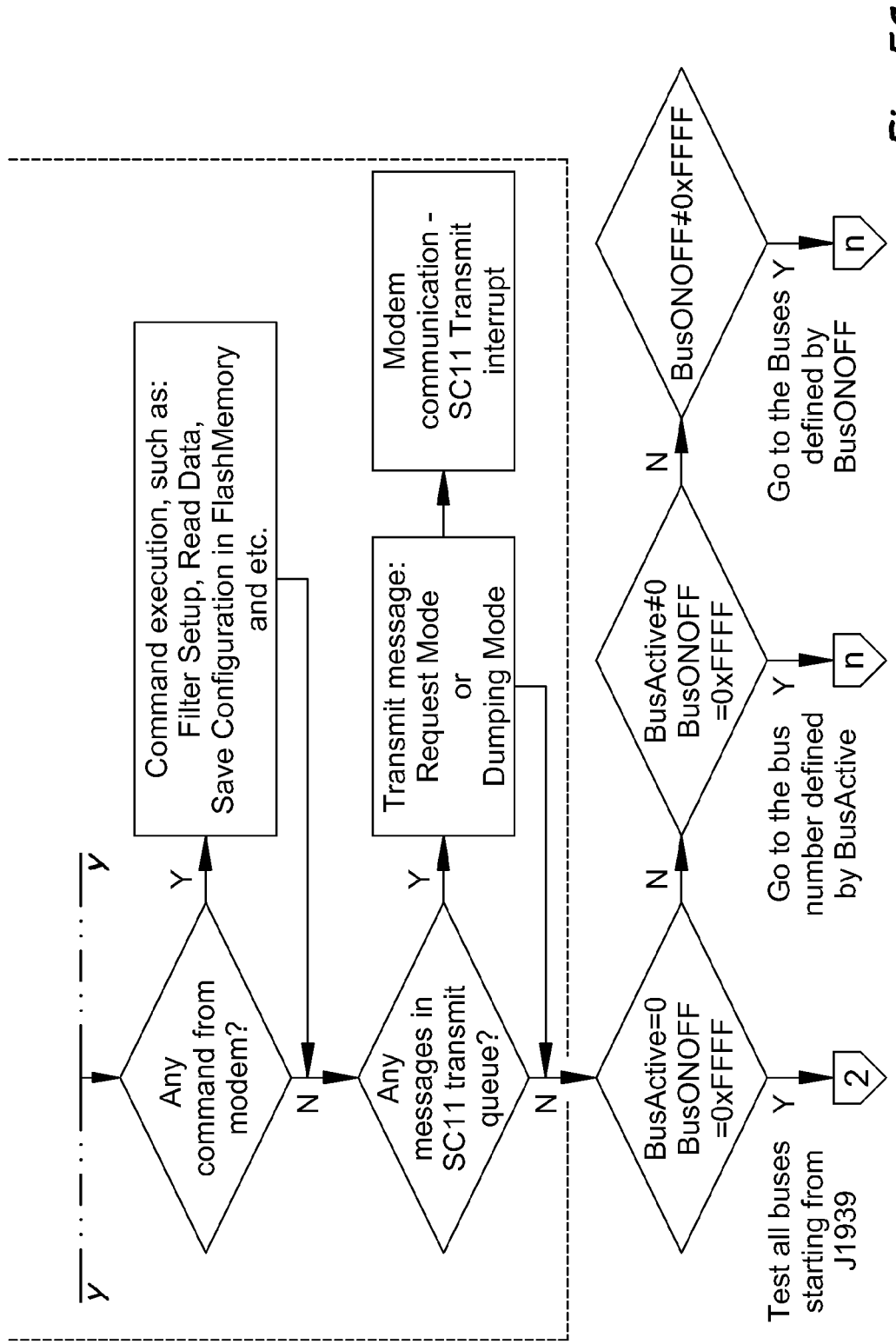
Figure 5D:
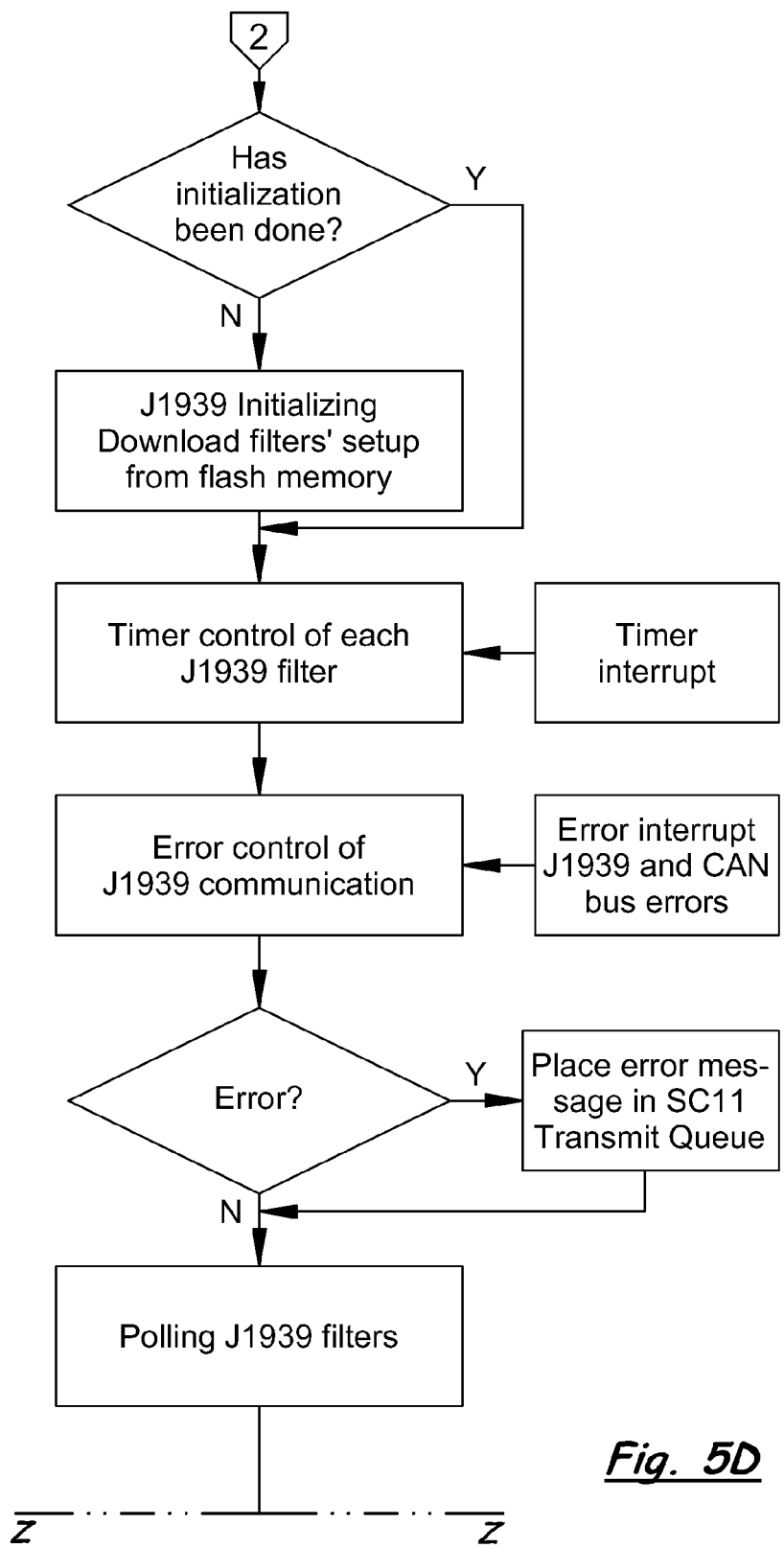
Figure 5E:
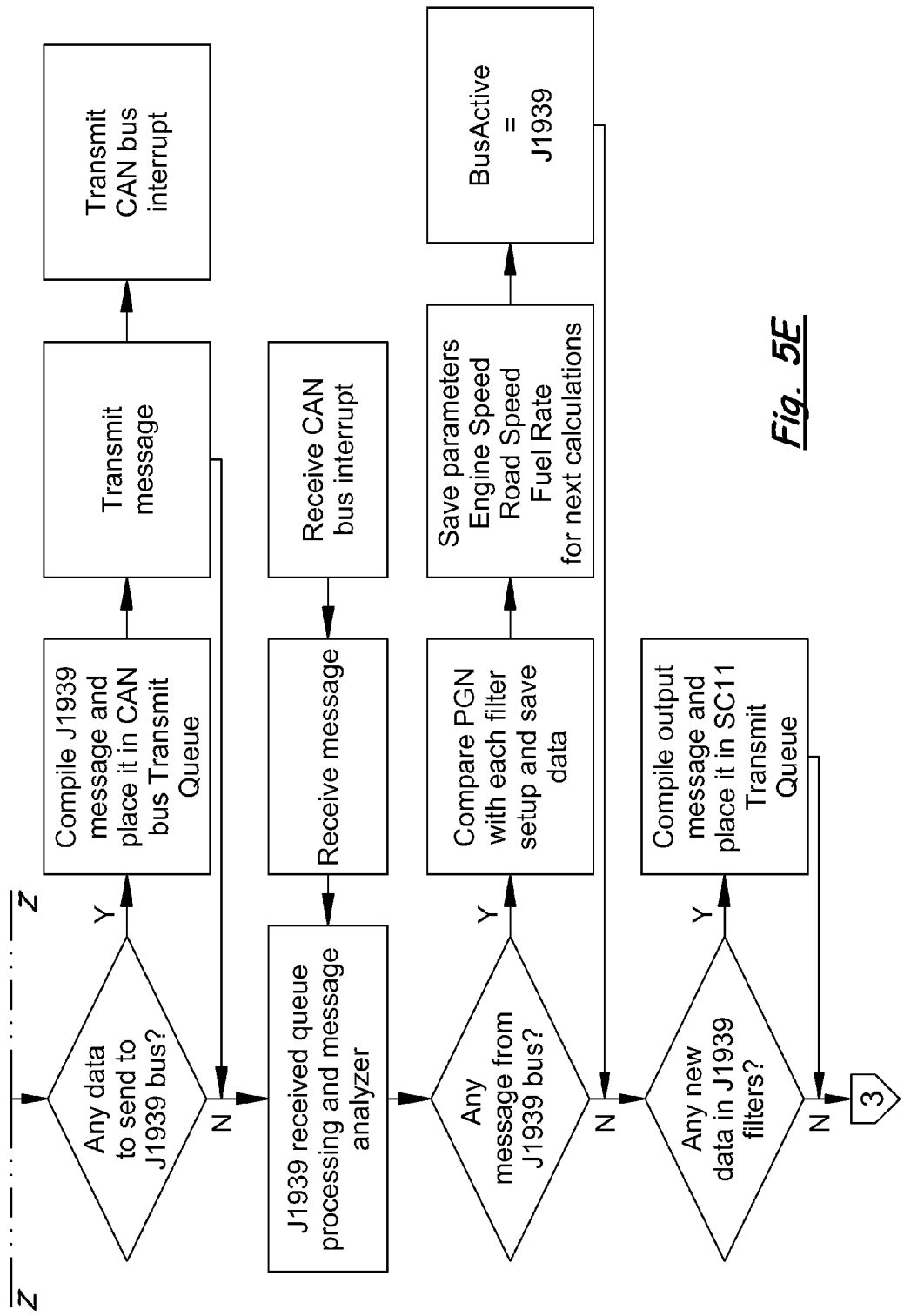
Figure 5F:
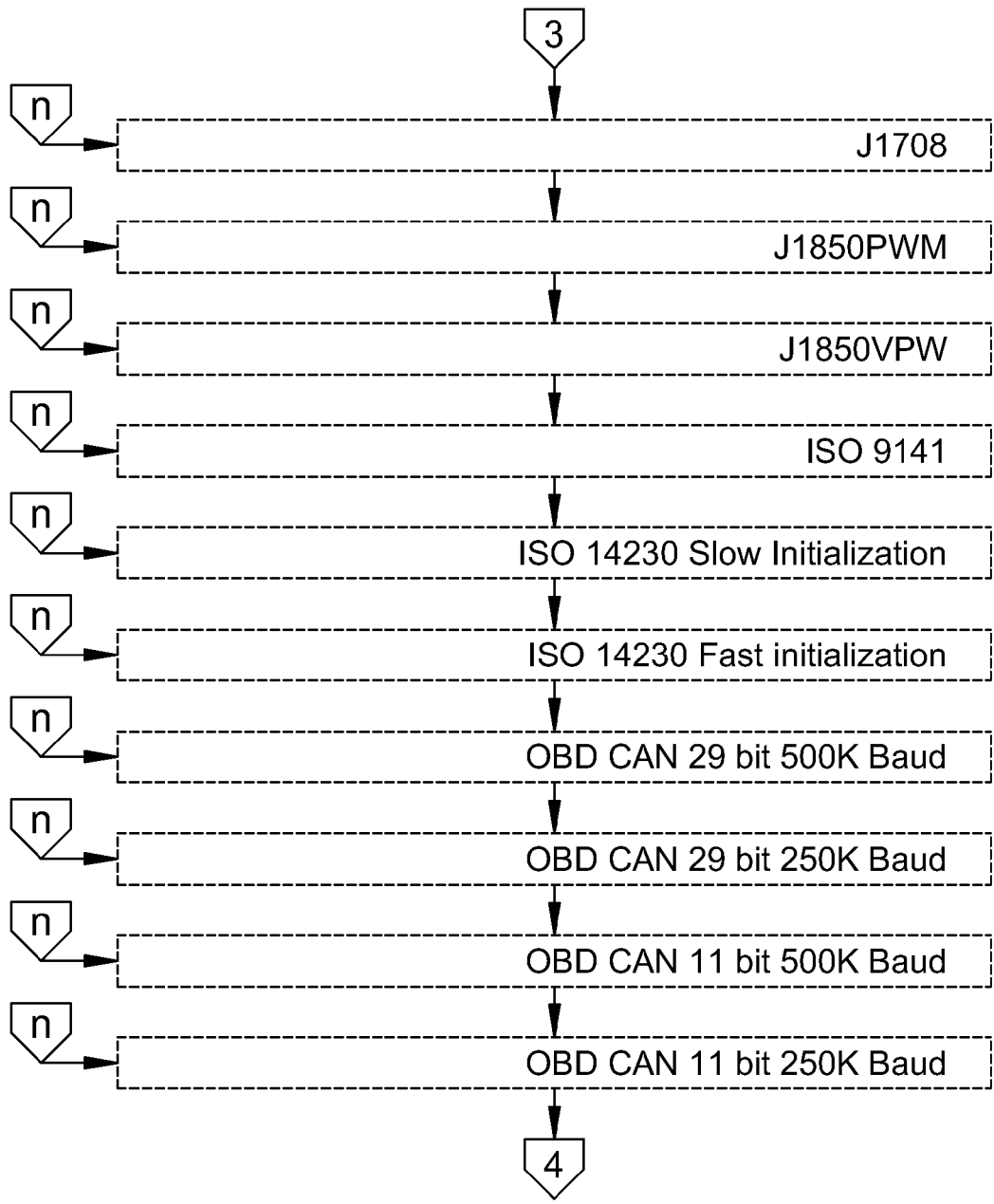
Figure 5G:
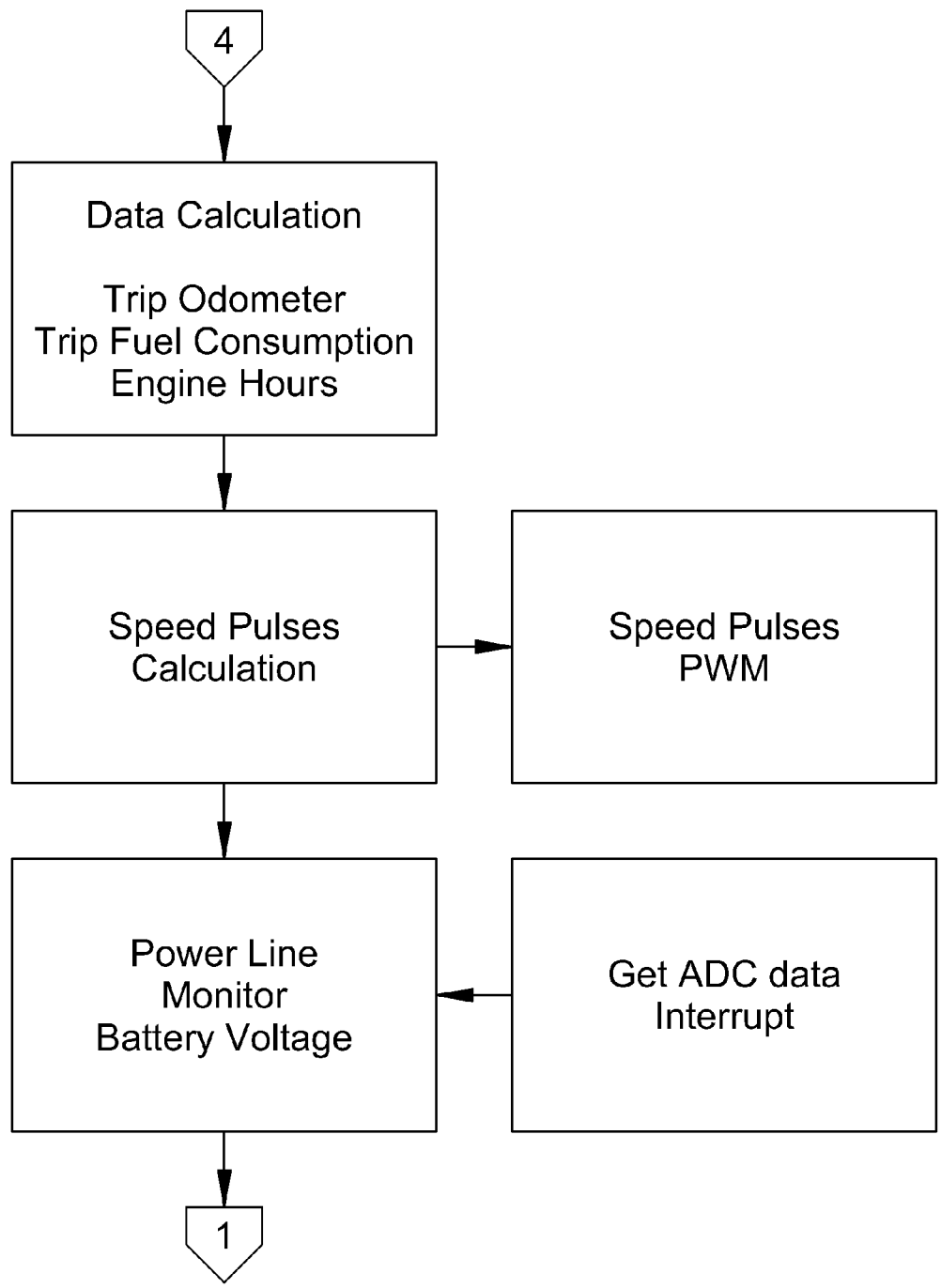

Speed pulses controller module 54 generates output pulses with 50% duty cycle and frequency depends on road speed: 0 km/h—0 Hz and 64 km/h—512 Hz. Each internal vehicle bus controller module monitors, by default, vehicle road speed to feed speed pulses controller module. The speed pulses calculation routine is depicted in FIG. 5G.

Figure 6:
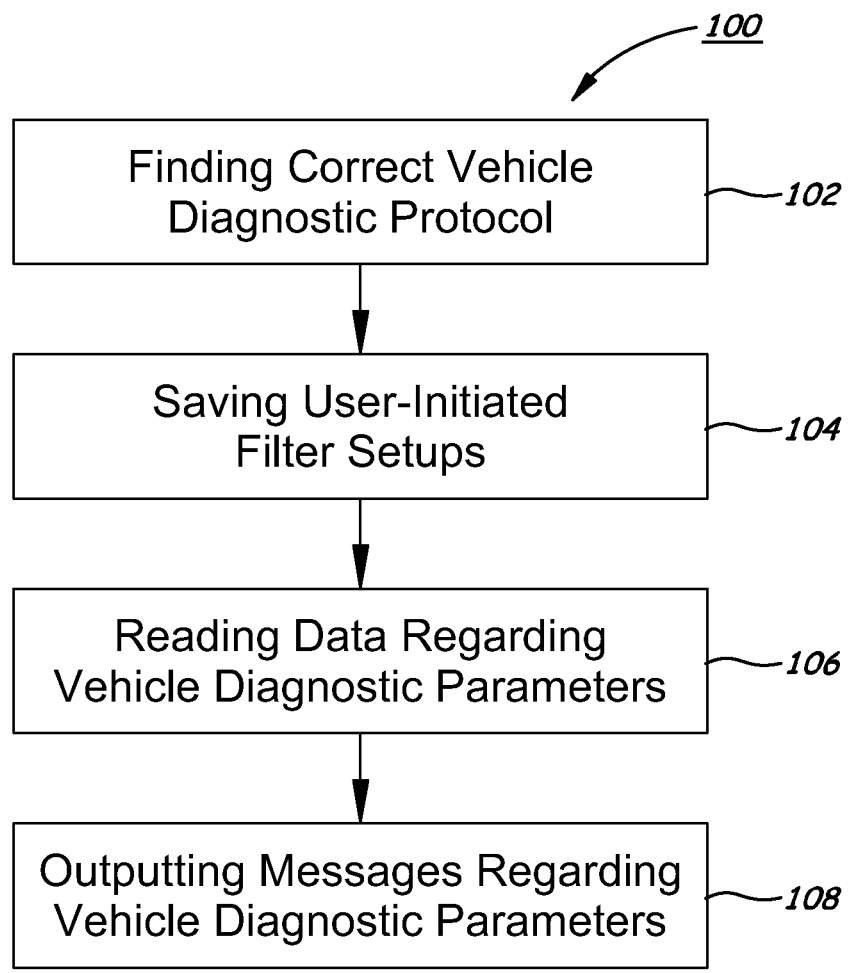
FIG. 6 is a general block diagram of an exemplary embodiment of the multi-protocol vehicle diagnostic interface method of the present invention.

Referring to FIG. 6, there is illustrated a general block diagram 100 of an exemplary embodiment of the method of the present invention performed by the interface device 10. As an overview of the method, the first step 102 relates to finding the correct vehicle diagnostic protocol. The second step 104 involves saving user-initiated filter setup according to the active bus. The third step 106 relates to reading data regarding vehicle diagnostic parameters selected by filters. The fourth step involves outputting messages regarding vehicle diagnostic parameters saved in the filters.

More particularly, in connection with the first step, as per block 102, of finding the correct vehicle onboard computer diagnostic protocol out of different multiple supported protocols, the interface device 10, simultaneously, may detect and control only one vehicle bus. An exception is provided for heavy duty J1939 and J1708 bus controller modules which can work in parallel on some trucks. To allow the interface device 10 to work with these two bus modules simultaneously, commands "Set Bus ON" and "Set Bus OFF" are used. After the first power ON, the processor is looking for the bus which is set ON by default and starts working with it regardless of the actual vehicle bus. If all vehicle buses by default are ON, the interface device 10 starts testing each vehicle bus and, after finding the working one, save the number of it in flash memory. That bus now is default bus. External device controls current default bus using commands "Set Bus ON" and "Set Bus OFF". To make the interface device 10 looking for new bus after finding working one and saving it in memory, send two commands—set all buses OFF (reset all variables) and then set all buses ON. Refer to FIGS. 5B and 5C.

With regard to the second step, as per block 104, of defining the user-selected vehicle operational parameters by saving their indicators or IDs in the filters, the configuration of the filter setup (or default setup) is saved in flash memory and may be changed by an external communication device 14 via the communication module 50 Interface device 10 uses three different sets of filters, for example, sixteen regular or single packet filters, eight internal filters and four extended or multi-packet filters, which are populated or set up with IDs of desired parameters. Regular and internal filters save only one message, while extended filters save up to five packets of a multi-packet message, such as VIN number. Internal filters are used only for data calculation purposes, for example, trip odometer on the basis of road speed, fuel consumption on the basis of fuel rate or engine hours on the basis of engine speed trip odometer, and contain data required for that. The internal filters are not available for user access.

Each filter consists of "Vehicle Message ID", flag "Filter ON/OFF", flag "New Message Arrived", "Update Timer" and "Actual Received Message". "Vehicle Message ID" depends on type of vehicle bus and consists of four bytes. For J1939 and J1708 buses, a user may set up filters using vehicle message ID directly—PGN or MID/PID. Refer to FIGS. 8A and 8B. In case of OBDII buses, each filter contains reference to the internal database, where there is located, for example, eighty-five entries of request messages for various parameters. A user may select, for example, twenty parameters from the database to setup filters. Refer to FIGS. 9A-9C. Additionally, some buses may use a mask to extend the range of accepted messages. Flag "Filter ON/OFF" controls filter's status. When new message arrived and filter is ON, the interface device 10 saves entire vehicle message in the filter and set the flag "New Message Arrived".

With regard to the third step, as per block 106, of reading data regarding parameters from a vehicle diagnostic communication port 12 according to the filter setups defining the ID of user-selected vehicle parameters, the bus controller modules 58-70 have two modes, namely, monitor mode and request mode. In request mode the bus controller modules accepts broadcast messages and sends request for requested messages according to the filters setup—parameter ID and "Update Timer". "Update Timer" controls the interval of receiving new data from the vehicle bus. The timer contains 1 byte with bit resolution 500 ms. Timer value 0 means no timer is applied—data is updated according to vehicle bus transmission rate, value 0xFF means that filter will be updated only once.

In monitor mode the modules 58-70 just reads and outputs the entire message traffic on the bus. All sixteen regular filters save data regardless of filter setup and work as a sixteen-message circular queue. There are two commands "Set Bus Monitor ON" and "Set Bus Monitor OFF" switching between monitor and request modes.

With regard to the fourth step, as per block 108, of outputting messages with a unified structure regarding the parameters, communication module 50 is involved. Communication module 50 is an RS232 interface configured, for example, at 11520 baud, 8 data bits, 1 stop bit and no parity, no flow control. The communication module 50 has two modes—dumping and request. In the dumping mode the interface device 10 via the communication module 50 outputs data from all filters with active flag "New Message Arrived". In request mode the processor is waiting for data request command from the external communication device 14. Extended filters work in different way according to output mode. In request mode, they save the first five packet of multi-packet message. In dumping mode, the interface 10 output unlimited number of messages via the extended filters in block of five packets.

In the description herein, embodiments disclosing specific details have been set forth in order to provide a thorough understanding of the invention, and not to provide limitation. However, it will be clear to one having skill in the art that other embodiments according to the present teachings are possible that are within the scope of the invention disclosed. All parameters, dimensions, materials, and configurations described herein are examples only and actual values of such depend on the specific embodiment.

What is claimed is:

1. A multi-protocol vehicle diagnostic interface device, comprising:
   a processor;
   a memory communicating with said processor and containing indicators of vehicle operational parameters from which a user may select to set up different ones of multiple filters;
   a communication module communicating with said processor; and
   a plurality of protocol bus modules supporting different multiple vehicle diagnostic protocols and having said multiple filters for set up in correspondence with the indicators of user-selected parameters;
   wherein said processor is configured to control said memory and modules to cooperate with one another to find the correct vehicle diagnostic protocol out of multiple supported vehicle diagnostic protocols, define the indicators corresponding to user-selected parameters by saving user-initiated filter setups, read data regarding user-selected parameters from a vehicle diagnostic communication port according to the filter setups, prior to pushing the data to the communication module, modify the data depending on the correct vehicle diagnostic protocol found to form vehicle messages regarding the user selected parameters, the vehicle messages being modified to have a unified format with a similar frame or frames regardless of the correct vehicle diagnostic protocol found, push the vehicle messages having said unified format to the communication module where the vehicle messages are wrapped in output messages having a unified structure, and output the output messages to an external communication device.

2. The device of claim 1 wherein said multiple vehicle diagnostic protocols supported by said bus controller modules include J1708; J1939; OBDII CAN—11 bit ID/500 kBaud,—29 bit ID/500 kBaud,—11 bit ID/250 kBaud and—29 bit ID/250 kBaud; ISO 9141; ISO 14230—(fast initialization) and—(slow initialization); and J1850—VPW and—PWM.

3. The device of claim 1 wherein said multiple vehicle diagnostic protocols supported by said bus controller modules include at least J1708 and J1939.

4. The device of claim 3 wherein said processor can read data concurrently from said bus modules supporting said J1708 and J1939 protocols.

5. The device of claim 1 wherein said bus modules contain at least two sets of filters.

6. The device of claim 5 wherein one set of filters are regular filters in each of which only one message can be saved.

7. The device of claim 5 wherein one of said sets of filters are extended filters in each of which up to five packets of a multi-packet message can be saved.

8. A multi-protocol vehicle diagnostic interface device, comprising:
a processor;
a memory communicating with said processor and containing indicators of vehicle operational parameters from which a user may select to set up different ones of multiple filters;
a communication module communicating with said processor;
a calculation module communicating with said processor; and
a plurality of protocol bus modules supporting different multiple vehicle diagnostic protocols and having multiple filters for set up in correspondence with the indicators of user-selected parameters;
wherein said processor is configured to control said memory and modules to cooperate with one another to find the correct vehicle diagnostic protocol out of multiple supported vehicle diagnostic protocols,
define the indicators corresponding to user-selected parameters by saving user-initiated filter setups,
read data regarding user-selected parameters from a vehicle diagnostic communication port according to the filter setups,
make calculations of the user-selected parameters,
modify vehicle messages regarding the calculations to form vehicle messages having a unified format with a similar frame or frames regardless of the correct vehicle diagnostic protocol found;
push said vehicle messages having said unified format to the communication module where said vehicle messages are wrapped in output messages having a unified structure; and
output the output messages to an external communications device.

9. The device of claim 8 wherein said multiple vehicle diagnostic protocols supported by said bus controller modules include J1708; J1939; OBDII CAN—11 bit ID/500 kBaud,—29 bit ID/500 kBaud,—11 bit ID/250 kBaud and—29 bit ID/250 kBaud; ISO 9141; ISO 14230—(fast initialization) and—(slow initialization); and J1850—VPW and—PWM.

10. The device of claim 8 wherein said multiple vehicle diagnostic protocols supported by said bus modules include at least J1708 and J1939.

11. The device of claim 10 wherein said processor can read data concurrently from said bus modules supporting said J1708 and J1939 protocols.

12. The device of claim 8 wherein said bus modules contain at least two sets of filters.

13. The device of claim 12 wherein one set of filters are regular filters in each of which only one message of a single packet can be saved.

14. The device of claim 12 wherein one set of filters are extended filters in each of which up to five packets of a multi-packet message can be saved.

15. The device of claim 8 wherein one of said sets of filters are internal filters which are used for data calculation.

16. A multi-protocol vehicle diagnostic interface method, comprising:
finding the correct vehicle onboard computer diagnostic protocol out of different multiple supported vehicle diagnostic protocols;
defining the indicators corresponding to different user-selected multiple vehicle operational parameters by saving user-initiated filter setups;
reading data regarding the user-selected parameters from a vehicle diagnostic communication port according to the filter setups;
prior to pushing the data to a communication module, modifying the data depending on the correct vehicle diagnostic protocol found to form vehicle messages regarding the user-selected parameters, the vehicle messages being modified to have a unified format with a similar frame or frames regardless of the correct vehicle diagnostic protocol found;
pushing the vehicle messages having said unified format to the communication module where said vehicle messages are wrapped in output messages having a unified structure; and
outputting the output messages to an external communication device.

17. The method of claim 16 further comprising the step of making a calculation, in a multi-protocol vehicle diagnostic interface device, of at least one of trip odometer, trip fuel consumption, trip engine hours, fuel rate and battery voltage.

18. The method of claim 16 wherein said defining includes selecting by a user from a database the addresses of different ones of vehicle operational parameters to be set up in different ones of filters of multiple supported protocols.

19. The device of claim 1, wherein said processor is configured to modify the data by modifying just a header thereof.

20. The method of claim 16, wherein modifying the data is performed by modifying just a header thereof.

* * * * *